(No Model.)
C. D. BIGELOW.
Apparatus for Collecting and Settling Dust.
No. 230,992. Patented Aug. 10, 1880.
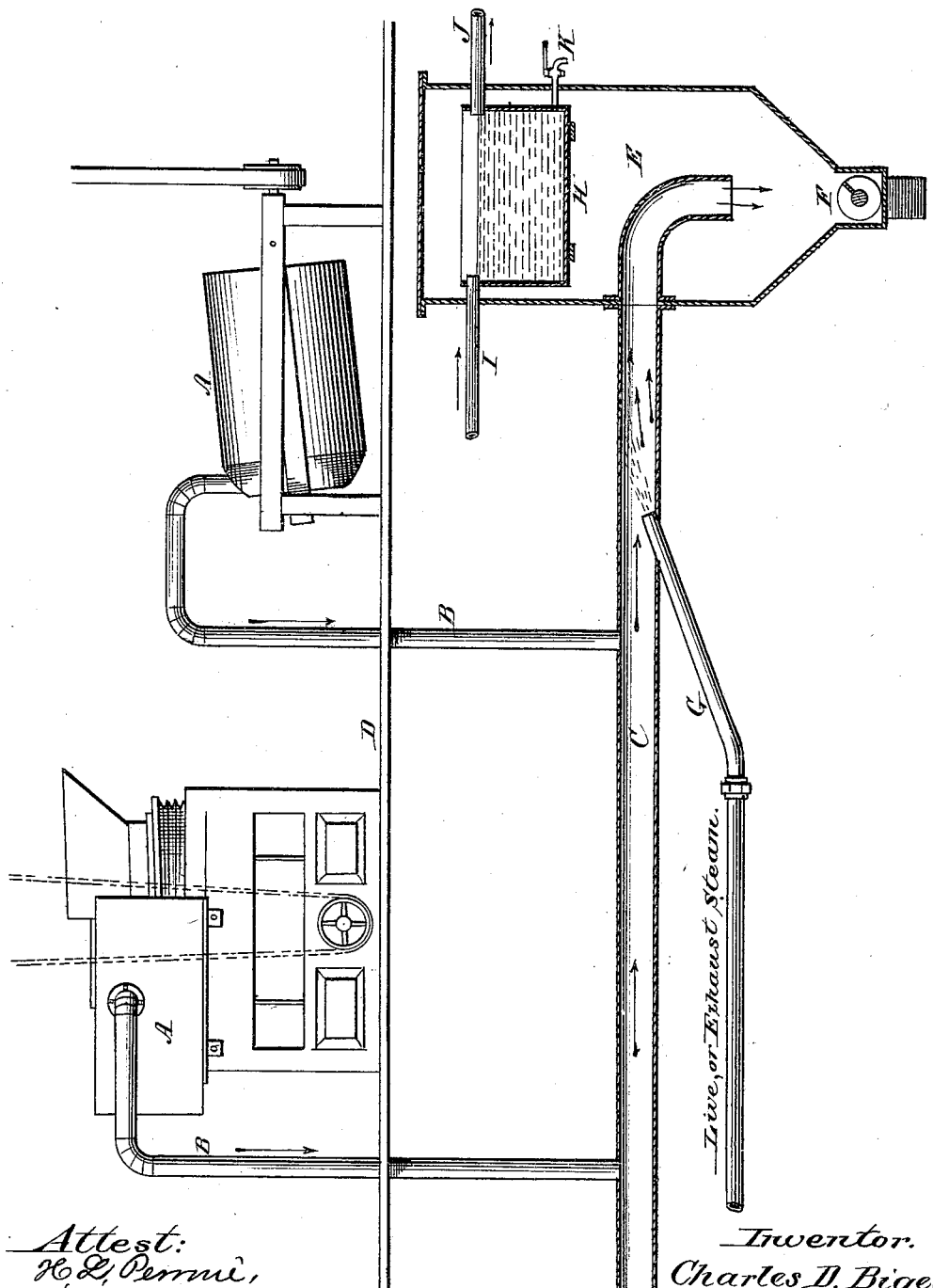
Attest:
H. L. Pennie,
Floyd Norris.
Inventor.
Charles D. Bigelow
By Johnson & Johnson
Atty's

UNITED STATES PATENT OFFICE.

CHARLES D. BIGELOW, OF BROOKLYN, NEW YORK, ASSIGNOR OF ONE-HALF OF HIS RIGHT TO HENRY M. BIGELOW, OF BOSTON, MASSACHUSETTS.

APPARATUS FOR COLLECTING AND SETTLING DUST.

SPECIFICATION forming part of Letters Patent No. 230,992, dated August 10, 1880.

Application filed May 21, 1880. (No model.)

*To all whom it may concern:*

Be it known that I, CHARLES DANA BIGELOW, a citizen of the United States, residing at Brooklyn, in the county of Kings and State of New York, have invented new and useful Improvements in Apparatus for Collecting and Settling Dust from Ore-Separators and other Machinery, of which the following is a specification.

In machines for crushing or pulverizing ores it is important to reduce them to such fineness as to effect the most successful separation or concentration by the separator, and hence there is more or less loss in the escape of dust in such reduction, while in that class of separators in which air is the medium of separation the dust is increased. The percentage of mineral in the escaping dust is about double that which is in the reduced quartz, and it is a matter of great importance to collect and separate the mineral from the dust. Hitherto this dust has been collected in a water-bath or in a dry chamber and conveyed directly to a smelter by means of a suction-pipe and fan-blower, the dust being received as it rises from the separator by an open and disconnected hood of the suction-pipe. In such suction-pipe the dust has been precipitated by jets of water issuing from an interior perforated pipe; but such flow of water is not only an additional expense in apparatus, but the flow of water and the air-blast require the expenditure of considerable power.

The object of my improvement is to save the expense of the fan-power and of the water-jet apparatus and to effect the operation of collecting and settling the dust practically without cost by the exhaust-steam from the engine which operates the crushing and separating machines, and from which the dust will be drawn by direct connecting pipe or pipes into a main conduit, with which the exhaust-steam pipe connects, at a point in advance of the machine connecting pipe or pipes, and projected into a closed steam-chamber, in which it is settled, and from which it is conveyed directly into a slimer or wet concentrator. The force of the steam not only acts as an ejector to draw, by vacuum, the dust into the main dust-conduit and to project it therefrom, but to moisten, dampen, and settle it within the steam-chamber. Provision is made in this chamber for condensing the steam and for collecting therefrom any of the mineral which may result from such condensation, so that every particle of the mineral escaping with the dust is thus saved.

By my improvement the dust-conveying pipes connect with the machines by inclosing-cases, so that the dust is drawn directly therefrom, thus preventing it from escaping into the room in which the machines operate and avoiding the injurious results of such dust upon the health of the workmen.

I have shown in the drawing two separating-machines in connection with my improved dust-collecting apparatus, and it is obvious that one of these machines may represent an ore crusher or pulverizer. These machines are provided with inclosing-cases A, with which the dust-pipes B separately communicate, and lead to the main dust-conduit C, which I prefer to arrange under the flooring D of the mill or room. This conduit is closed at one end, and enters by its open end a closed chamber, E, situated in any convenient place either within or outside of the mill, and within which the dust is delivered. It has a hopper-shaped bottom provided with a screw-conveyer, F, for discharging the collected dust through a suitable opening or openings in the trough. At a point in advance of the dust-pipe nearest this chamber a steam-ejector pipe, G, is inserted in the dust-conduit, the effect of the steam-jet from which creates a vacuum in the closed portion of the conduit, and thereby draws the dust from the closed case or cases of the machine or machines, and by the force of the steam projects it into the steam-chamber E, at the same time moistening and dampening the dust, so that the particles of ore will settle in the bottom of the hopper at once, and for this purpose I prefer to have the conduit open downward in the chamber. As the dust is drawn in contact with the steam it is dampened in the conduit, and is discharged therefrom in condition to settle at once in the steam-chamber, and in order to condense the steam collecting therein I combine with the receiving-chamber, preferably in the upper portion thereof, a sheet-metal tank, H, within which a flow of cold water is maintained by an inflow-pipe, I, and an outflow-pipe, J, the said tank being open at the top and separated from the walls of the chamber all around, leaving space for the steam to circulate all around and in contact with the sides and bottom of the tank, and thus be condensed. By this means any metal or mineral particles which may settle into the tank with the condensed steam will be saved, and I may also cause the outflow of water to pass through a filter or into a tank to collect such matter as may pass off with the outflow, and thus effect a complete saving of the dust-particles of the mineral.

Access is had to the chamber for cleaning out the tank-collection, and a cock, K, is provided for drawing off the water for this purpose.

The dust-conduit may be from twelve to fifteen inches in diameter, and the steam-pipe about three or four inches in diameter.

I propose to use the exhaust-steam from the engine alone when that is deemed sufficient for the purpose; but I may also connect the exhaust-pipe with a pipe connecting directly with the boiler, so as to use live steam when found necessary to obtain greater suction force in the dust-conduit.

An important advantage in the use of steam, besides supplying the required suction for drawing the dust from the machines and forcing it from a main conduit, is that it completely fills the exit portion of the dust-conduit, and thereby thoroughly envelops and dampens every particle of the matter drawn from the machine, so that when it enters the chamber very little, if any, will rise to the tank with the steam.

It is obvious that my improved apparatus may be applied to any machine from which it is desirable to collect the dust.

It is also obvious that the dust may be delivered from the conduit directly into a water-tank, and that any number of machines may be connected to the main dust-conduit.

I am aware that suction-blowers have been used in connection with a pipe or trunk in which the dust is precipitated by a jet of steam or water, and I do not claim, broadly, such a thing.

I claim—

1. In apparatus for collecting and settling dust from ore-separators and other machines, the combination of the dust-collecting conduit C and the dust-collecting receptacle E with the steam pipe or ejector G, entering said dust-conduit in advance of the entrance therein of the dust from the machine, substantially as and for the purpose herein set forth.

2. The combination of the pipe or pipes B and an inclosed chamber, A, of the machine with which it connects, with the dust-collecting conduit C, the closed dust-collecting chamber E, and the steam pipe or ejector G entering said dust-conduit, substantially as and for the purpose herein set forth.

3. The combination of the dust-collecting conduit C, the dust-collecting closed chamber, and the steam pipe or ejector entering said dust-conduit with the water-tank H, arranged within said chamber, substantially as and for the purpose herein set forth.

4. The combination, in apparatus for collecting and settling dust, of the pipe B, connecting with an inclosed chamber, A, of the machine, the main dust-conduit C, the steam ejector or pipe G, the closed steam-chamber E, and the condenser H, arranged therein, substantially as herein set forth.

In testimony whereof I have hereunto set my hand in the presence of two subscribing witnesses.

CHAS. D. BIGELOW.

Witnesses:
A. E. H. JOHNSON,
J. W. HAMILTON JOHNSON.